(12) United States Patent
Gerwin et al.

(10) Patent No.: US 7,481,923 B2
(45) Date of Patent: Jan. 27, 2009

(54) ADDITIVE DISPERSING FILTER AND METHOD OF MAKING

(75) Inventors: Weston H. Gerwin, Perrysburg, OH (US); Michael S. Lynch, Fostoria, OH (US); Nageswara R. Cheekala, Perrysburg, OH (US); Zafar Hussain, Perrysburg, OH (US); Ronald P. Rohrbach, Flemington, NJ (US); Daniel E. Bause, Flanders, NJ (US); Peter D. Unger, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/846,265

(22) Filed: Aug. 28, 2007

(65) Prior Publication Data

US 2008/0047887 A1    Feb. 28, 2008

Related U.S. Application Data

(60) Provisional application No. 60/840,661, filed on Aug. 28, 2006.

(51) Int. Cl.
*B01D 35/00* (2006.01)
(52) U.S. Cl. .............. 210/206; 210/167.02; 210/167.3
(58) Field of Classification Search ............ 210/167.02, 210/167.3, 98.1, 199, 205, 206, 201, 202, 210/DIG. 131; 123/196 A
See application file for complete search history.

(56) References Cited

U.S. PATENT DOCUMENTS

| 5,591,330 | A | 1/1997 | Lefebvre |
| 5,718,258 | A | 2/1998 | Lefebvre et al. |
| 5,993,054 | A | 11/1999 | Tan et al. |
| 6,623,636 | B2 | 9/2003 | Rohrbach et al. |
| 2005/0040092 | A1 | 2/2005 | Eilers et al. |
| 2005/0150569 | A1* | 7/2005 | Garvin et al. ............... 141/100 |
| 2006/0065584 | A1 | 3/2006 | Hacket et al. |

OTHER PUBLICATIONS

International Search Report Dated Mar. 3, 2008, International Application No. PCT/US 07/76997.
Written opinion of International Searching Authority Dated Mar. 3, 2008, International Application No. PCT/US 07/76997.

* cited by examiner

*Primary Examiner*—Matthew O Savage
*Assistant Examiner*—Lucas Stelling
(74) *Attorney, Agent, or Firm*—Cantor Colburn LLP

(57) ABSTRACT

A filter, comprising: a housing defining an inlet fluid opening and an outlet fluid opening, the inlet fluid opening and the outlet fluid opening defining a fluid path through the filter; a filter element disposed inside the filter housing, the filter element being disposed in the flow path such that fluid flowing through the flow path must pass through the filter element; and a dispersement device disposed within the housing, the dispersement device comprising a housing having at least one chamber for an additive disposed within the at least one chamber, the dispersement device further comprises a metering opening that is sealed with an oil soluble material the metering opening being in fluid communication with the at least one chamber when the oil soluble material is removed from the metering opening.

7 Claims, 2 Drawing Sheets

ADDITIVE DISPERSING FILTER AND METHOD OF MAKING

CROSS REFERENCE TO RELATED APPLICATIONS

This application claims the benefit of U.S. Provisional Patent Application 60/840,661 filed Aug. 28, 2006 the contents of which are incorporated herein by reference thereto.

The present application is also related to the following patent applications: Ser. No. 10/352,344, filed Jan. 27, 2003; Ser. No. 09/867,973, filed May 30, 2001; Ser. No. 09/566,034 filed May 8, 2000; U.S. patent application Ser. No. 10/863,581, filed Jun. 8, 2004; U.S. patent application Ser. No. 11/488,466, filed Jul. 18, 2006; U.S. patent application Ser. No. 11/533,649 filed Sep. 20, 2006; U.S. patent application Ser. No. 11/845,042, filed Aug. 25, 2007; and U.S. patent application Ser. No. 11/854,043, filed Aug. 25, 2007, the contents each of which are incorporated herein by reference thereto.

BACKGROUND

The present invention relates to a filter for a fluid and a method for making the same.

Many different types of fluid filters are known. Most such filters use a mechanical or 'screening' type of filtration, with a porous filter element disposed therein. The oil is repeatedly cycled through the filter element to remove impurities.

In the oil filtration art, it is well known that normal operation of an internal combustion engine, particularly a diesel engine, results in the formation of contaminants. These contaminants include, among others, soot, which is formed from incomplete combustion of the fossil fuel, and acids that result from combustion. These contaminants are typically introduced into the lubricating oil during engine operation, and tend to increase oil viscosity and generate unwanted engine deposits, leading to increased engine wear.

The conventional solution to these problems has been to place various additives into lubricating oils, during their initial formulation. In order to combat soot-related problems, many conventional lubricating oils include dispersants that resist agglomeration of soot therein. These work well for a short period, but may become depleted. Additionally, due to the solubility and chemical stability limits of these dispersants in the oil, the service lives of the lubricating oil and the oil filter are less than optimal.

In order to counteract the effects of acidic combustion products, many conventional motor oils include neutralizing additives known as over-based detergents. These are a source of TBN (total base number), which is a measure of the quantity of the over-based detergent in the oil. The depletion of the TBN is an important limiting factor for many internal combustion engines, and in particular for heavy-duty applications with diesel engines.

In order to improve engine protection and to combat other problems, conventional lubricating oils often include one or more further additives, which may be corrosion inhibitors, antioxidants, friction modifiers, pour point depressants, detergents, viscosity index improvers, anti-wear agents, and/or extreme pressure additives. The inclusion of these further additives may be beneficial; however, with conventional methods, the amount and concentration of these additives are limited by the ability of lubricating oils to suspend these additives, as well as by the chemical stability of these additives in the oil.

While the known filters are usable for their intended purposes, the release of supplemental additives from the known filters often takes place either immediately after installation or more rapidly than is needed for protecting the oil. Subsequently, after some time has elapsed, there may be little or no additive left in the filter.

Another problem with many of the known filter designs is that beneficial additives are added to the oil before the oil is mechanically filtered through a filter element. As a result, when the oil is mechanically filtered, some of the beneficial additives that have just been added may be immediately filtered out.

In addition, and due to emission regulations that went into effect during 2002, heavy/medium duty diesel engines have been forced to run at conditions that deteriorate the crank case lube oil additive package at an accelerated rate. This leads to a reduction in the number of miles a truck can travel before the crank case oil needs to be changed, causing increase in downtime and operating costs of the truck, thus a reduction of profits for the owner.

Therefore it is desirable to provide a filter having an additive incorporated therein, wherein the additive is slowly released over the useful life of the filter. It is also desirable to provide an oil filter which could extend the useful life of engine oil so as to allow a user to extend the time interval between oil changes of an engine.

SUMMARY OF THE INVENTION

An additive dispersing filter and method of making is provided. Exemplary embodiments provide a filter, comprising: a housing defining an inlet fluid opening and an outlet fluid opening, the inlet fluid opening and the outlet fluid opening defining a fluid path through the filter; a filter element disposed inside the filter housing, the filter element being disposed in the flow path such that fluid flowing through the flow path must pass through the filter element; and a dispersement device disposed within the housing, the dispersement device comprising a housing having at least one chamber for an additive disposed within the at least one chamber, the dispersement device further comprises a metering opening that is sealed with an oil soluble material the metering opening being in fluid communication with the at least one chamber when the oil soluble material is removed from the metering opening.

In another exemplary embodiment a filter is provided, the filter comprising: a housing defining an inlet fluid opening and an outlet fluid opening, the inlet fluid opening and the outlet fluid opening defining a fluid path through the filter; a filter element disposed inside the filter housing, the filter element being disposed in the flow path such that fluid flowing through the flow path must pass through the filter element; a dispersement device disposed within the housing, the dispersement device comprising a housing having a first chamber and a second chamber, the second chamber being sealed from the first chamber by a pair of dividing walls, the dispersement device being secured to the filter element and a central opening of the filter element and the dispersement device are in fluid communication with the outlet fluid opening; a first additive disposed within the first chamber; a second additive disposed within the second chamber; a first metering opening that is sealed with an oil soluble material the first metering opening being in fluid communication with the first chamber when the oil soluble material is removed from the first metering opening; and a second metering opening that is sealed with an oil soluble material the second metering opening being in fluid communication with the second chamber when the oil soluble material is removed from the second metering opening.

In another exemplary embodiment a method of supplying an additive in an oil filter is provided, the method comprising: forming a dispersement device housing with a first chamber and a second chamber, the second chamber being sealed from the first chamber by a pair of dividing walls; sealing a first metering opening with an oil soluble material the first metering opening being in fluid communication with the first chamber when the oil soluble material is removed from the first metering opening; sealing a second metering opening with an oil soluble material the second metering opening being in fluid communication with the second chamber when the oil soluble material is removed from the second metering opening; disposing a first liquid additive within the first chamber; disposing a second liquid additive within the second chamber; sealing the dispersement device housing with a cap, the cap being configured to seal the first chamber and the second chamber within the dispersement device housing; and securing the dispersement device housing to a filter element of the filter, the filter element and the dispersement device defining an outlet fluid opening, such that fluid flowing into and out of the filter must pass through the filter element and into the outlet fluid opening and the cap is located between the filter element and the dispersement device housing.

Exemplary embodiments are also directed to an additive dispersing member configured to be received within an oil filter.

The above-described and other features are appreciated and understood by those skilled in the art from the following detailed description, drawings, and appended claims.

DETAILED DESCRIPTION OF EXEMPLARY EMBODIMENTS

In accordance with exemplary embodiments of the present invention, a filter and method of making a filter is disclosed. In an exemplary embodiment the filter will be comprised of an additive cartridge or dispersement device for providing a means for introducing an additive into oil being filtered by the filter. In addition, an additive cartridge and method of making is also disclosed wherein the cartridge provides a means for retaining an additive for dispersement into the oil over a period of time.

Figure 1:
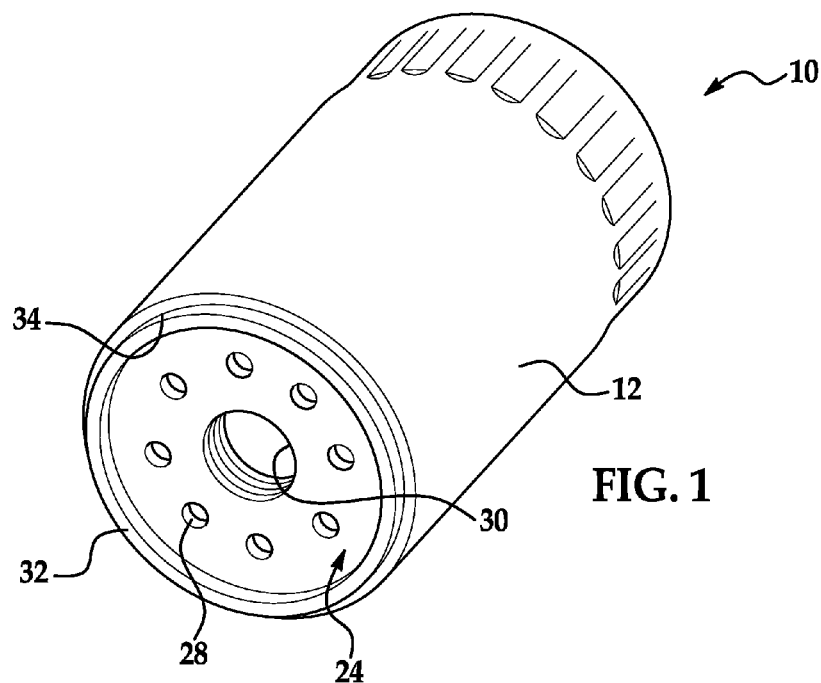
FIG. 1 is a perspective view of an oil filter constructed in accordance with an exemplary embodiment of the present invention.
Figure 2:
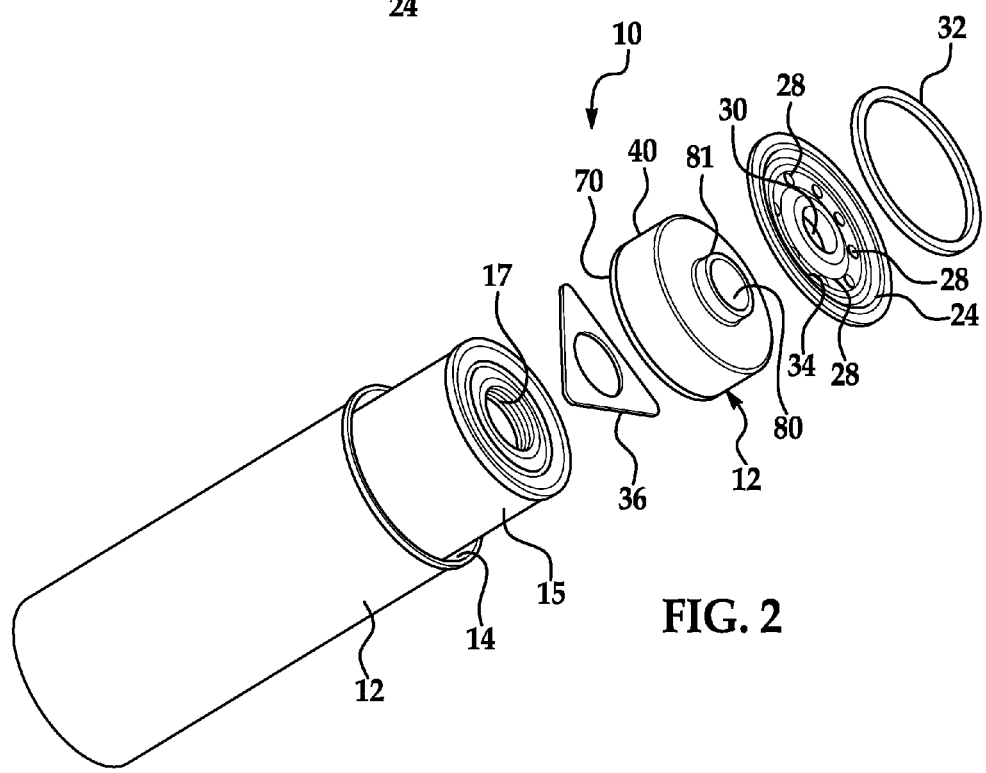
FIG. 2 is an exploded perspective view of an oil filter constructed in accordance with an exemplary embodiment of the present invention.

Referring to FIGS. 1 and 2, there is shown an oil filter 10 according to a first exemplary embodiment of this invention. The oil filter generally includes a hollow cylindrical housing 12 which defines a hollow chamber 14 therein, a porous, mechanical filter element 15 within that chamber, and a centrally located additive cartridge or dispersement device 18, also retained inside the housing chamber 14.

The housing also includes a base plate 24 sealingly attached to the case or housing. A foraminous center tube may, optionally, be provided within the filter housing to supportively reinforce the mechanical filter element thereon.

The housing base plate includes a plurality of inlet ports 28 formed therethrough and arranged in a circular pattern. The base plate also includes a central outlet port 30. The outlet port has a plurality of female threads formed therein, to allow rotatable mounting of the filter on an externally threaded hollow tubular fitting on an engine block (not shown). An annular external seal or gasket 32 fits engagingly into a groove formed at the bottom surface of the base plate, to resist oil leakage outwardly from the base of the filter.

A gasket 36 is disposed between additive cartridge or basket 18 and the mechanical filter element.

In the depicted embodiment of FIGS. 1-2, the mechanical filter element 15 includes a conventional cylindrical member made of accordion-pleated filter paper having a center tube or central opening 17 that allows fluid filtered by the mechanical filter element to exit the filter through central outlet port 30. Alternatively, the filter element may be manufactured in accordance with the teachings of U.S. provisional patent application Ser. No. 11/533,649 filed Sep. 20, 2006; and/or U.S. patent application Ser. No. 11/845,042, filed Aug. 25, 2007; the contents each of which are incorporated herein by reference thereto.

The additive cartridge includes a housing portion 40 having a first chamber 42 and a second chamber 44. First chamber 42 is separated from second chamber 44 by a pair of dividing walls 46 and 48. In one embodiment a liquid additive is disposed in chambers 42 and 44. A metering opening 50 is provided to allow the additive of first chamber 42 to pass therethough during usage of the filter. In accordance with an exemplary embodiment metering opening has a diameter of approximately 20/1000 of an inch. Thus, the additive is slowly metered out over the useful life of the filter. Of course, metering openings greater or less than the aforementioned opening are contemplated to be within the scope of exemplary embodiments of the present invention. Furthermore, a single opening 50 may be provided or multiple openings may be provided for fluid communication to chamber 42.

Similarly a metering opening 52 is provided to allow the additive of second chamber 44 to pass therethough during usage of the filter. In accordance with an exemplary embodiment metering opening 52 also has a diameter of approximately 20/1000 of an inch. Thus, the additive is slowly metered out over the useful life of the filter. Of course, metering openings greater or less than the aforementioned opening are contemplated to be within the scope of exemplary embodiments of the present invention. Furthermore, a single opening 52 may be provided or multiple openings may be provided for fluid communication to chamber 44.

Each metering opening is sealed with an oil soluble material, which dissolves when the filter is used. In one embodiment, the oil soluble material may be a wax and the additive disposed in chambers 42 and 44 is a liquid. Alternatively, and if applicable, the oil soluble material may comprise the additive disposed in the chambers 42 and 44 if the additive is a non-viscous material (e.g., gel).

In accordance with an exemplary embodiment, chamber 42 comprises one additive and chamber 44 comprises another, each being distinct from one another. For example and in one non-limiting embodiment one additive is an antioxidant and the other is an over based detergent.

Of course, other additives are contemplated in accordance with exemplary embodiments of the present invention. In addition, the housing 40 may be configured to have multiple chambers and multiple metering holes. Alternatively, the housing may be configured to have only a single chamber and a single metering hole or plurality of metering holes thus only one additive is provided by the single chamber of the additive cartridge or dispersement device.

In one non-limiting exemplary embodiment, the additives are liquid in form and the oil soluble sealing material over openings 50 and 52 is a wax, which melts away during use thereby uncovering the metering hole. In other words when the engine oil reaches operational temperature the oil becomes hot enough to melt the wax and then the additives are dispersed into the oil. Moreover, the dimension of the metering opening or openings slowly disperses the additive over time or over the useful life of the filter. Alternatively, the additives are gels or pellets and the gel itself may comprise the sealing material.

Figure 3A:
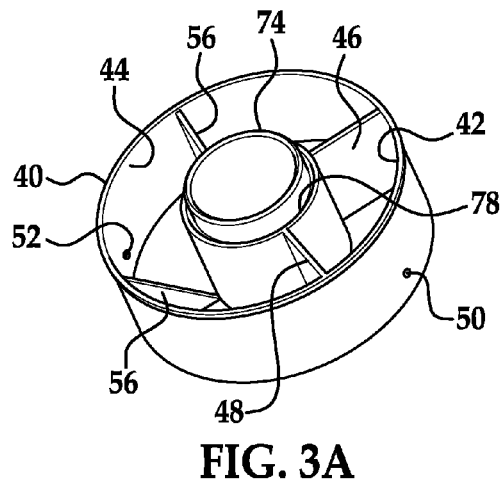
FIGS. 3A-4C are views illustrating an additive cartridge for use in exemplary embodiments of the present invention.
Figure 3B:
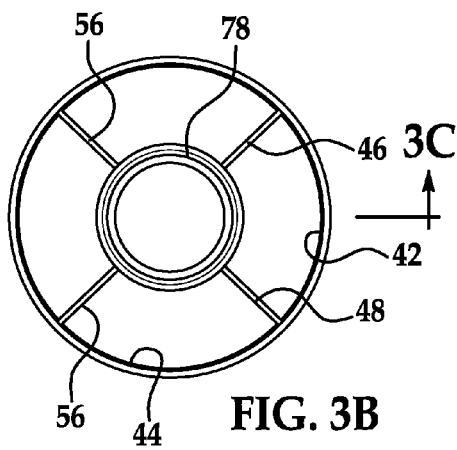
Figure 3C:
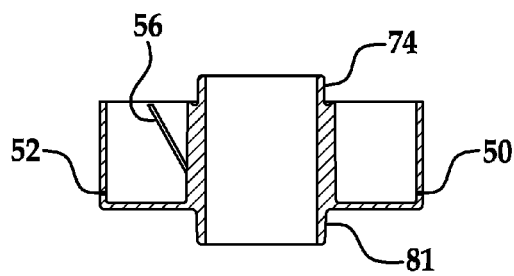

As illustrated in FIG. 3 second chamber 44 is larger than chamber 42 thus, structural ribs 56, if necessary, are located in the second chamber. Alternatively, second chamber 44 is constructed without structural ribs 56. Accordingly, a larger amount of additive can be placed in the second chamber as opposed to the first chamber. Structural ribs 56 are angled such that they will not interfere with the fluid flow of the additive from the chamber. In other words, the structural ribs at one point will terminate at a bottom surface of the housing (e.g., opposite cap 70), which is proximate to the metering opening(s). Furthermore and as applications require the size of chambers 42 and 44 may vary as the required amounts of the additives varies. For example and in one non-limiting embodiment, one additive is an antioxidant and the other is an over based detergent and if required, a larger amount of the antioxidant additive may be supplied in the larger chamber as opposed to the over based detergent in the smaller chamber. Of course, the amounts of additives, types and size and number of chambers may vary. For example, a larger amount of over based detergent may be supplied in the larger chamber as opposed to the antioxidant additive in the smaller chamber. Again, any one of the additives mentioned herein may be disposed in the chambers in various amounts.

In addition, the housing has neck portions on either side of the housing for engagement with the outlet opening of the base plate and the center opening of the filter media. This will allow for ease of placement as well as providing a fluid seal for fluid transfer through the dispersement housing.

In accordance with an exemplary embodiment of the present invention, the housing will have a neck portion 81 that depends away from the housing such that when the same is fluidly sealed to the outlet opening of the base plate 24 a gap is maintained between a surface of the additive cartridge and the inlet openings 28 of the base plate in order allow fluid flow over the top of the additive cartridge and then along the side walls of the cartridge containing openings 50 and 52 and then into filter media 15 and then ultimately through the center opening 17 and the outlet path 80, which is in fluid communication with opening 30 so that filtered oil or fluid can exit the filter. Accordingly, and as fluid flows past metering openings 50 and 52 additive stored in the dispersement device is released into fluid or oil flowing past the additive cartridge or dispersement device.

It being understood that the outer periphery of the additive cartridge and the filter media are slightly smaller than the inner dimension of the housing of the filter such that fluid flowing into the inlet openings 28 passes through the gap between the top of the additive cartridge and the base plate and then into a gap or flow path defined by the outer periphery of the housing of the additive cartridge and the outer periphery of the filter media and the inner dimension of the housing of the filter, wherein the fluid then flows into the filter media and back out of the filter housing via the outlet path defined by openings 17, 80 and 30. In one non-limiting exemplary embodiment, the outer periphery of the filter media and the housing of the additive cartridge are substantially the same thus making insertion of the filter media and the dispersement device or additive cartridge into the housing simple. Furthermore, there is no requirement to resize the filter housing to accommodate the additive cartridge. For example, an existing filter housing design without an additive cartridge may be used by simply reducing the length of the filter media to accommodate for the height of the additive cartridge.

The additive composition includes one or more additives which may be selected from the group including basic conditioners, corrosion inhibitors, metal deactivators, antioxidants, dispersants, friction modifiers, oil stabilizers, pour point depressants, detergents, viscosity index improvers, anti-wear agents, extreme pressure additives, mixtures of the above additives, and/or other known beneficial additives.

The basic conditioner of the additive cartridge, where used, is preferably a basic salt selected from the group consisting of lithium hydroxide, calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, potassium hydroxide, and mixtures thereof.

Of course, other compositions may be used as the additive (s).

Figure 4A:
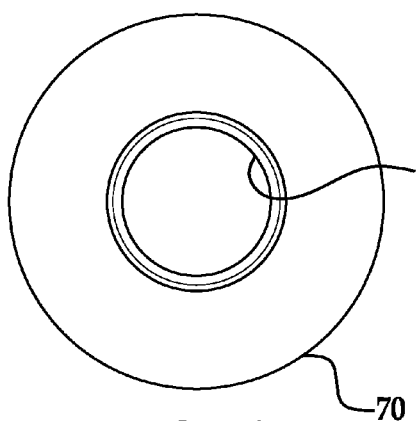
Figure 4B:
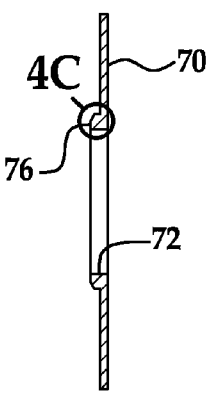
Figure 4C:
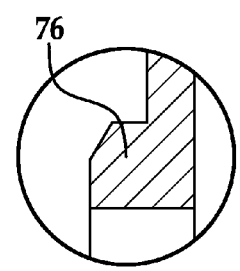

FIG. 4 illustrates a cap 70 that is configured to be secured to housing 40 after the additives are disposed therein. In accordance with an exemplary embodiment of the present invention cap 70 is circular or disk shape with an opening 72 configured to receive a neck portion 74 of the housing therein. Of course, other configurations are contemplated to be within the scope of exemplary embodiments of the present invention. As illustrated, the neck portion 74 will extend past cap 70 to provide a feature for receipt into opening 17 of an end cap of the filter media. Cap 70 in one exemplary embodiment will have an annular feature 76 for receipt in an annular groove 78 of the housing. In one embodiment feature 76 will provide a heat staking member for securement of the cap to the housing by a vibration welding method, ultrasonic welding method or spin welding. Alternatively or in addition to the aforementioned welding techniques an adhesive is used to secure the feature into the groove. Similar features and methods may be employed to secure a peripheral end of the cap to the outer walls of the housing.

In accordance with an exemplary embodiment a method of supplying an additive in an oil filter is provided, the method comprising: forming a dispersement device housing with a first chamber and a second chamber, the second chamber being sealed from the first chamber by a pair of dividing walls; sealing a first metering opening with an oil soluble material the first metering opening being in fluid communication with the first chamber when the oil soluble material is removed from the first metering opening; sealing a second metering opening with an oil soluble material the second metering opening being in fluid communication with the second chamber when the oil soluble material is removed from the second metering opening; disposing a first liquid additive within the first chamber; disposing a second liquid additive within the second chamber; sealing the dispersement device housing with a cap, the cap being configured to seal the first chamber and the second chamber within the dispersement device housing; and securing the dispersement device housing to a filter element of the filter, the filter element and the dispersement device defining an outlet fluid opening, such that fluid flowing into and out of the filter must pass through the filter element and into the outlet fluid opening and the cap is located between the filter element and the dispersement device housing.

Accordingly, the housing is first filled with an additive in at least one chamber and then the housing is sealed with a cap. Since the cartridge in one embodiment is disposed between the filter media and the base plate 24 the housing is inverted so that cap 70 is disposed between the end cap of the media and the housing of the additive cartridge. Alternatively and if the cartridge is disposed on the other side of the filter media away from the end cap the cartridge may not need to be inverted during its installation.

Housing portion 40 and cap 70 of additive cartridge, dispersement device or basket 18 are configured to provide an outlet path 80, which is in fluid communication with opening 30 so that filtered oil or fluid may pass therethrough.

The material selected for the cartridge shell and cap is preferred to be a material which remains stable in a hot oil environment. Preferred materials are metals such as steel and oil-tolerant plastics such as, polyacetals and equivalents thereof. The cartridge allows the beneficial additive composition to be slowly released into the oil, thereby conditioning the oil in a metered manner over time.

By incorporating into the lube filter the needed additives, via the additive dispersement device or additive cartridge, to reinforce the ones that are depleted, the lube filter can help extend the effective life of the oil back to pre-2002 emission regulation intervals and beyond. This is done by storing the required additive(s) in a storage basket(s) or other equivalent devices that reside inside the oil filter. The basket(s) can be located in the center tube portion of the mechanically active filter, above or below the mechanically active filter element or any combination thereof. The basket(s) may have a single or multiple pockets that can store the required additive(s). Each pocket will have a single or multiple holes to control the release rate of the additives that reside in each respective pocket. The number, size and location of the holes will be used to control the release rate of the additive(s). By properly controlling the release rate of the additive the effectiveness of the additives can be enhanced. A sensor may also be incorporated into the dome of the filter that will monitor oil condition and provide real-time feedback to the owner or operator of the truck.

The additive baskets would preferably be made from injection molded plastic. After the basket is molded the metering holes will be plugged with an oil soluble material capable of withstanding production and storage conditions, but also being able to release during operation of the truck to allow the release of additives within the given pockets. In production, after the metering holes are plugged the additive can be filled into each respective pocket. Once the additives have been put into the pocket the basket will be completely sealed and is ready for assembly into the lube filter. The basket can be sealed by a gasket with adhesive on one side or a cap that is vibration welded, spin welded or glued to the basket housing. After the additive basket is assembled into the lube filter, the lube filter is seamed up providing the final product. The final product will fit the specified applications with no modification to mounting parameters and will be installed in the same manner traditional lube filters are installed. For example, in one embodiment the housing of the dispersement device has a circular configuration and an outer periphery of the housing of the dispersement device is substantially similar to an outer periphery of the filter element such that the dispersement device is easily secured to the filter element and the two items are secured into the filter housing without any major modifications to the outer housing of the filter.

Once installed on the system or engine, the hot fluid (e.g., oil, fuel or coolant) will cause the sealants disposed on the metering openings to be removed and the additive will then be free to flow out of the metering opening or openings.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A filter, comprising:
   a housing defining an inlet fluid opening and an outlet fluid opening, the inlet fluid opening and the outlet fluid opening defining a fluid path through the filter;
   a filter element disposed inside the filter housing, the filter element being disposed in the flow path such that fluid flowing through the flow path must pass through the filter element;
   a dispersement device disposed within the housing, the dispersement device comprising a housing having a first chamber and a second chamber, the second chamber being sealed from the first chamber by a pair of dividing walls, the dispersement device being secured to the filter element and a central opening of the filter element and the dispersement device are in fluid communication with the outlet fluid opening;
   a first additive disposed within the first chamber;
   a second additive disposed within the second chamber;
   a first metering opening that is sealed with an oil soluble material the first metering opening being in fluid communication with the first chamber when the oil soluble material is removed from the first metering opening; and
   a second metering opening that is sealed with an oil soluble material the second metering opening being in fluid communication with the second chamber when the oil soluble material is removed from the second metering opening.

2. The filter as in claim 1, wherein the first additive and the second additive are compositions comprising at least one additive selected from the group consisting of basic conditioners, corrosion inhibitors, metal deactivators, antioxidants, dispersants, friction modifiers, oil stabilizers, pour point depressants, detergents, viscosity index improvers, anti-wear agents, extreme pressure additives, and mixtures thereof.

3. The filter as in claim 2, wherein the first additive and the second additive are compositions comprising a basic salt selected from the group consisting of lithium hydroxide, calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, potassium hydroxide, and mixtures thereof.

4. The filter as in claim 1, wherein the dispersement device is located substantially centrally in the filter housing between the inlet fluid opening and the outlet fluid opening and the filter element.

5. The filter as in claim 1, wherein the dispersement device is formed from an oil tolerable plastic and the filter is an oil filter and the additive composition is a liquid.

6. The filter as in claim 5, wherein the housing of the dispersement device further comprises a central opening aligned with the outlet fluid opening of the filter.

7. The filter as in claim 1, wherein the dispersement device further comprises a cap secured to the housing of the dispersement device, the cap being secured to the housing of the dispersement device after the first additive is disposed in the first chamber and the second additive is disposed in the second chamber and the cap is positioned between the dispersement device and the filter element after the cap is secured to the housing of the dispersement device and the second chamber is larger than the first chamber and a larger amount of the second additive is disposed in the second chamber as opposed to an amount of the first additive disposed in the first chamber and the second chamber further comprises a pair of structural ribs, the structural ribs being configured so that they will not interfere with a fluid flow of the second additive from the second chamber.

* * * * *